US008660499B2

(12) United States Patent
Sagae et al.

(10) Patent No.: US 8,660,499 B2
(45) Date of Patent: *Feb. 25, 2014

(54) DELIVERY SYSTEM, DELIVERY APPARATUS, TERMINAL APPARATUS AND METHOD

(75) Inventors: Yuta Sagae, Kawasaki (JP); Hitoshi Yoshino, Yokosuka (JP)

(73) Assignee: NTT DoCoMo, Inc., Tokyo (JP)

( * ) Notice: Subject to any disclaimer, the term of this patent is extended or adjusted under 35 U.S.C. 154(b) by 328 days.

This patent is subject to a terminal disclaimer.

(21) Appl. No.: 13/060,762

(22) PCT Filed: Aug. 13, 2009

(86) PCT No.: PCT/JP2009/064309
§ 371 (c)(1),
(2), (4) Date: Jun. 15, 2011

(87) PCT Pub. No.: WO2010/024134
PCT Pub. Date: Mar. 4, 2010

(65) Prior Publication Data
US 2011/0244903 A1    Oct. 6, 2011

(30) Foreign Application Priority Data

Aug. 25, 2008    (JP) ................................. 2008-215927

(51) Int. Cl.
*H04B 1/00*        (2006.01)
(52) U.S. Cl.
USPC ............ 455/68; 455/3.01; 455/515; 455/3.03
(58) Field of Classification Search
USPC ................. 455/3.01, 3.03, 414.3, 422.1, 447, 455/452.1, 434, 515, 68; 370/328, 252
See application file for complete search history.

(56) References Cited

U.S. PATENT DOCUMENTS

| 7,768,915 | B2 * | 8/2010 | Nakai ........................... 370/230 |
| 2010/0027466 | A1 | 2/2010 | Mustapha |
| 2011/0237179 | A1 * | 9/2011 | Sagae et al. .................. 455/3.01 |

FOREIGN PATENT DOCUMENTS

| JP | 2-171826 A | 7/1990 |
| JP | 2004-523970 A | 8/2004 |

(Continued)

OTHER PUBLICATIONS

International Search Report issued Nov. 17, 2009 in PCT/JP09/64309 filed Aug. 13, 2009.

(Continued)

*Primary Examiner* — John J Lee
(74) *Attorney, Agent, or Firm* — Oblon, Spivak, McClelland, Maier & Neustadt, L.L.P.

(57) ABSTRACT

A delivery system includes a delivery apparatus for delivering a common control signal to an area having one or more available communication systems and a terminal apparatus for receiving the common control signal transmitted from the delivery apparatus. The common control signal includes system information required to access the communication systems in the area, and the system information includes multiple control information items. The delivery system causes the delivery apparatus to generate a first common control signal commonly used in one or more areas, to receive a delivery request signal from the terminal apparatus requesting to deliver a certain control information item and to generate a second common control signal including the certain control information item to transmit to the terminal apparatus. Criteria to determine which of the control information items is to be included in the first common control signal are updated in accordance with a statistical tendency of the delivery request signals from the terminal apparatuses.

8 Claims, 8 Drawing Sheets

(56) References Cited

FOREIGN PATENT DOCUMENTS

WO    WO 02/054818 A1    7/2002
WO    WO 2008/044664 A1    4/2008

OTHER PUBLICATIONS

Perez-Romero, Jordi et al., "A Novel On-Demand Cognitive Pilot Channel Enabling Dynamic Spectrum Allocation", IEEE, ISBN: 1-4244-0663-3, pp. 46-54, (2007).

Martigne, Particia et al., "An alternative concept to scanning process for cognitive radio systems: technical and regulatory issues", 16$^{th}$ 1st Mobile and Wireless Communications Summit, pp. 1-5, (Jul. 2007).

Extended European Search Report issued Sep. 24, 2012, in Application No. / Patent No. 09809787.6-2412 / 2320687.

D. Bourse, et al., "The E$^2$R II Flexible Spectrum Management (FSM) Framework and Cognitive Pilot Channel (CPC) Concept—Technical and Business Analysis and Recommendations", End-to-End Reconfigurability II (E$^2$R II) White Paper, XP008145264, Nov. 1, 2007, 52 pages.

Office Action issued Sep. 18, 2012 in Japanese Patent Application No. 2010-526652 (with English-language translation).

* cited by examiner

DELIVERY INFORMATION INDICES

DELIVERY SYSTEM, DELIVERY APPARATUS, TERMINAL APPARATUS AND METHOD

TECHNICAL FIELD

The present invention generally relates to the technical field of radio communication and particularly relates to a delivery system, a delivery apparatus, a terminal apparatus and a method for delivering a common control signal. The common control signal is a control signal including system information required to access one or more radio communication systems in an area where the radio communication systems are available.

BACKGROUND ART

In this technical field, a communication scheme using a cognitive pilot channel (CPC) is being discussed. In this scheme, the cognitive pilot channel is transmitted to each of multiple areas where one or more communication systems operate. The cognitive pilot channel includes some information items such as radio systems and their radio schemes and frequencies used in the individual areas. With the cognitive pilot channel, a terminal apparatus can obtain fundamental parameter information for connectable radio systems relatively easily. Also, with the cognitive pilot channel, a part of parameters statically assigned to the radio systems such as frequencies can be flexibly changed (as only control information has to be changed), although it has been conventionally difficult. The cognitive pilot channel brings about an effect that it is applicable without modification of the terminal apparatus itself. Thus, utilization of some techniques using the cognitive pilot channel can lead to cost reduction of the terminal apparatus, flexible accommodation to change of radio system parameters and so on. Since the change of the radio system parameters can be flexibly addressed, it can be expected to improve frequency utilization efficiency.

In this technology, an area covered by a delivery station (which may be combined with a base station apparatus) is divided into multiple sectors. The divided sectors are also referred to as meshes. A common control signal or a cognitive pilot channel is delivered within the delivery station's coverage area. A utilization method of radio resources such as fundamental parameter information for the radio system is indicated in the system information in the common control signal transmitted from the delivery station. Also, there are two types of delivery methods for the common control signal, a broadcast type delivery method and an on-demand type delivery method. In the broadcast type delivery method, the delivery station periodically delivers the control information to meshes within an area handled by the delivery station. In the on-demand type delivery method, in response to a delivery request from a terminal apparatus, the delivery station delivers the control information to a requesting mesh of the terminal apparatus. Also, the broadcast type delivery method and the on-demand type delivery method are combined, and a delivery method where these delivery methods are switched depending on delivered information is proposed. The on-demand type delivery method is described in non-patent document 1.

RELATED ART DOCUMENT

Non-Patent Document

Non-patent document 1: J. Perez-Romero, et al., "A Novel On-Demand Cognitive Pilot Channel enabling Dynamic Spectrum Allocation", IEEE Dyspan 2007.

SUMMARY OF INVENTION

Problem to be Solved by the Invention

However, conventional delivery systems have some problems as follows. In the conventional delivery systems, for divided individual meshes, the system information for the corresponding radio systems is delivered. At this time, importance level of the system information to a terminal apparatus is not taken into account. Thus, there may be cases where the system information of a low importance level is frequently transmitted unnecessarily and the system information of a high importance level is infrequently transmitted. The frequent delivery of the system information of a low importance level may degrade frequency utilization efficiency. In the case where the broadcast type delivery method is utilized as the delivery method, there are increasing opportunities to deliver unnecessary information to a terminal apparatus in an area having a small number of terminal apparatuses and small variations of frequency utilization state, which may decrease the frequency utilization efficiency. Also, in the case where the on-demand type delivery method is utilized as the delivery method, there are increasing request signals from terminal apparatuses in an area having a large number of terminal apparatuses, which may lead to crowded frequency bands due to an increasing number of delivery times of the common control signal (increasing overhead) and make it hard to secure communication bands.

One object of the present invention is to improve delivery efficiency of the common control signal in a delivery system for delivering the common control signal to an area where one or more communication systems are available.

Means for Solving the Problem

A delivery system according to one embodiment of the present invention includes a delivery apparatus for delivering a common control signal to an area having one or more available communication systems and a terminal apparatus for receiving the common control signal transmitted from the delivery apparatus. The common control signal includes system information required to access the communication systems in the area, and the system information includes multiple control information items.

The delivery system includes a first generation unit configured to generate a first common control signal commonly used in one or more areas, a reception unit configured to receive a delivery request signal from a terminal apparatus requesting to deliver a certain control information item and a second generation unit configured to generate a second common control signal including the certain control information item.

The terminal apparatus includes a reception unit configured to receive the first common control signal or the second common control signal transmitted from the delivery apparatus, an acquisition unit configured to acquire one or more of the control information items from the first common control signal or the second common control signal, a generation unit configured to generate a delivery request signal for requesting to deliver a certain control information item and a transmission unit configured to transmit the delivery request signal to the delivery apparatus.

The first common control signal is delivered to one or more areas, and in response to the delivery request signal from the terminal apparatus, the second common control signal including a certain control information item is delivered to the terminal apparatus. Criteria to determine which of the control information items the first generation unit includes in the first common control signal is updated in accordance with a statistical tendency of the delivery request signals from the terminal apparatuses.

Advantage of the Invention

According to the present invention, it is possible to improve delivery efficiency of the common control signal in a delivery system for delivering the common control signal to an area where one or more communication systems are available.

DETAILED DESCRIPTION OF EMBODIMENTS

Figure 1:
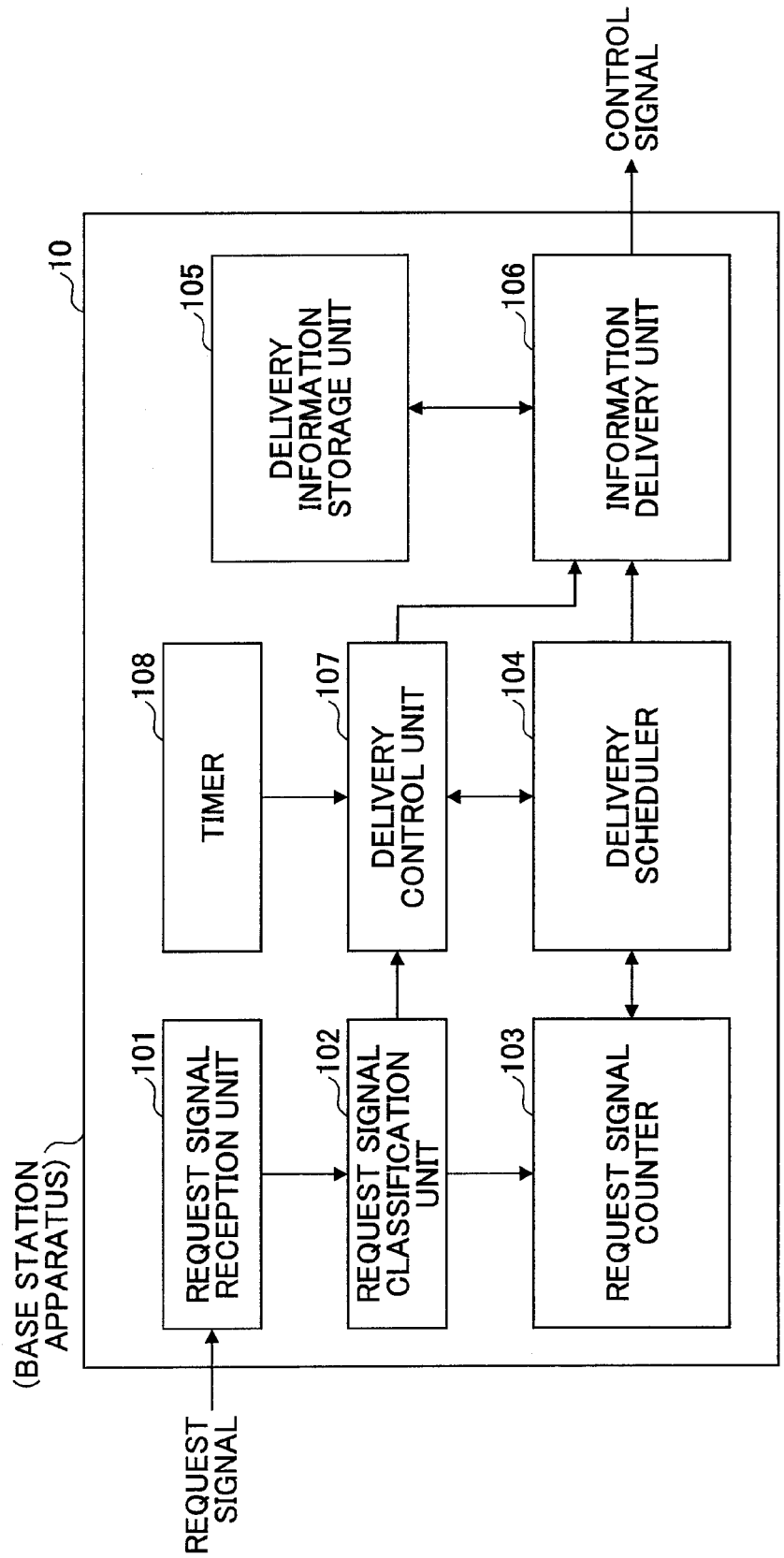
FIG. 1 is a block diagram illustrating a delivery apparatus according to one embodiment of the present invention.

A delivery apparatus according to one embodiment of the present invention is used in a system including several areas where one or more radio systems are available. In each of the areas, system information required to access the radio systems is delivered to a terminal apparatus in a common control signal. The common control signal may be delivered in not only a wireless manner but also a wired manner. The area corresponds to one mesh. Specifically, the system information includes information regarding operators of the radio systems in the mesh, information regarding frequencies used by the individual radio systems (center frequency and bandwidth information), information regarding a radio access technology (RAT), information regarding a charge method and so on.

A delivery apparatus according to one embodiment of the present invention intensively delivers system information frequently requested from terminal apparatuses. The system information includes multiple system information classes. The delivery apparatus receives a request signal from the terminal apparatus and identifies and classifies the system information classes in the request signal. Then, the delivery apparatus determines and delivers a system information class to be uniformly delivered to all the delivery apparatus coverage areas. Specifically, the multiple system information classes are classified into the system information classes to be delivered to all the area periodically and the system information classes to be delivered in response to a request from a terminal apparatus. The classification criteria are updated upon occurrence of an update event at the delivery apparatus. The periodically delivered system information classes are included in the first common control signal. The system information classes delivered upon requesting by a terminal apparatus are included in the second common control signal. Since the first or second common control signal can be delivered from the delivery apparatus in a manner suitable for a request tendency from the terminal apparatus, delivery chances can be periodically provided to more demanded information, which can decrease the number of requests from the terminal apparatus and improve frequency utilization efficiency.

The above statistical tendency may represent request frequency of each of the multiple control information items. This is preferred in that frequently requested and more valuable information is included in the first common control signal.

The respective control information items for each area may be associated with one or more values within a numerical range depending on the frequency, and one of the control information items corresponding to a random number generated within the numerical range may be included in the first common control signal. This is preferred in that the request frequency for the control information items is reflected to the likelihood of transmitting the control information item through the first common control signal.

The criteria to determine which of the control information items is to be included in the first common control signal may be updated in accordance with the statistical tendency of delivery request signals from terminal apparatuses and priority of the control information items. Setting the priority could increase the likelihood of delivering a certain control information item in the first common control signal. As a result, it is possible to determine contents of the first common control signal from viewpoints different from the statistical tendency. The priority may be represented as the minimum number of requests for the control information items or how to increase the number of requests (incremental amount). Further, the priority may be set not only for each control information item but also for each mesh. As a result, information items for a certain mesh can be likely to be included in the first common control signal.

A terminal apparatus according to one embodiment of the present invention determines a connecting radio system based on the system information delivered from the delivery apparatus and initiates synchronization and connection operations corresponding to its radio parameter. The terminal apparatus includes a reception unit configured to receive control information delivered from the delivery apparatus, an acquisition unit configured to acquire the system information from the received control information and a request unit configured to request a lacking system information class in the acquired system information.

A terminal apparatus according to one embodiment of the present invention receives a common control signal in an area having one or more available communication systems. The terminal apparatus may include a reception unit configured to receive the first or second common control signal transmitted from the delivery apparatus, an acquisition unit configured to acquire one or more control information items from the first or second common control signal, a generation unit configured to generate a delivery request signal for requesting to deliver a certain control information item, and a transmission unit configured to transmit the delivery request signal to the delivery apparatus. The terminal apparatus receives the first common control signal and after transmitting the delivery request signal, receives the second common control signal including the certain control information item. The criteria to determine which of the control information items is to be included in the first common control signal are updated in accordance with a statistical tendency of delivery request signals received at the delivery apparatus. If it is determine that all required control information items have not been obtained, the delivery request signal may be generated.

For convenience, the present invention is described in several separate embodiments or items. However, the separation is not essential to the present invention, and two or more of the embodiments or items may be combined as needed. Although specific numerical examples are used in the description to facilitate understandings of the present invention, unless specifically stated otherwise, these numerical examples are simply illustrative, and any other appropriate value may be used.

Embodiments of the present invention are described from the viewpoints as follows.
A. delivery apparatus
B. terminal apparatus
C. common control signal and request signal
D. determination of first common control signal
E. delivery of first and second common control signals First Embodiment Embodiments of the present invention are described below with reference to the drawings. In the accompanying drawings, elements particularly relevant with the embodiments are emphasized, and other elements are omitted for simplicity of the illustration.

[A. Delivery Apparatus]

FIG. 1 illustrates a delivery apparatus for use in this embodiment. The delivery apparatus delivers a common control signal to multiple areas (meshes). In each of the areas, one or more communication systems are available. Thus, the delivery apparatus is generally associated with one or more base stations in the one or more communication systems. The delivery apparatus may be arranged as an apparatus independent of any of the base stations. Alternatively, any of the base stations may combine functionality of the delivery apparatus. In FIG. 1, a request signal reception unit 101, a request signal classification unit 102, a request signal counter 103, a delivery scheduler 104, a delivery information storage unit 105, an information delivery unit 106, a delivery control unit 107 and a timer 108 are illustrated. The three components, the request signal reception unit 101, the request signal classification unit 102 and the request signal counter 103, play a main part in identification of request signals. The delivery scheduler 104, the delivery control unit 107 and the timer 108 play a main part in determination of contents of common control signals. The delivery information storage unit 105 and the information delivery unit 106 play a part in delivery of information.

The request signal reception unit 101 receives a request signal from a terminal apparatus.

The request signal classification unit 102 determines what information is requested by the request signal received from the terminal apparatus and classifies the request signal. The delivery apparatus transmits a first common control signal to all areas as well as a second common control signal to individual terminal apparatuses depending on the request signal. Determination as to which information item (also referred to as a system information class, a control information item and so on) is to be transmitted to the terminal apparatus in the second common control signal depends on what that terminal apparatus requests through the request signal. Criteria to determine which information item belongs to the first common control signal is updated in response to some sort of update events as described below. The update event may be passage of a predefined time period (which may be represented as days, hours, minutes, weeks and so on) or operator's instruction.

The request signal counter 103 provides statistic information regarding the classification results by the request signal classification unit 102 and the requested system information classes.

The delivery scheduler 104 updates the criteria to determine which of the system information classes are to be included in the first common control signal commonly transmitted to all the areas periodically and/or non-periodically. Also, the delivery scheduler 104 controls which of the system information classes is to be included in the second common control signal transmitted to individual terminal apparatuses issuing request signals. As one example, it is assumed that the system information classes in system information are identified as A, B, C, D, E and F. By setting a flag for A, it can be indicated that system information class A is included in the first or second common control signal. The delivery scheduler 104 stores such flags. The common control signal includes frequently requested system information classes or system information classes of higher priority or importance among the multiple system information classes.

The delivery information storage unit 105 stores information items that may be possibly delivered. In the above-mentioned example, contents of system information classes A through F are stored in the delivery information storage unit 105.

The information delivery unit 106 transmits the system information classes corresponding to the individual flags in the common control signal based on the set of flags indicated by the delivery scheduler 104.

The delivery control unit 107 controls operations of the respective components in the delivery apparatus. The delivery apparatus transmits the first common control signal to the terminal apparatus together with the second common control signal as needed. The criteria to determine which of the system information classes is to be included in the first and second common control signals are updated periodically and/or non-periodically. The delivery control unit 107 (1) determines which of the system information classes is to be included in the first common control signal and (2) controls operations to deliver the first and/or second common control signals.

The timer 108 determines whether a predefined time period has passed and indicates the determination result to the delivery control unit 107. The predefined time period may be associated with update frequency of the first common control signal. The predefined time period may be any appropriate time period and be identified as hours, minutes, seconds, days, weeks, months and so on.

[B. Terminal Apparatus]

Figure 2:
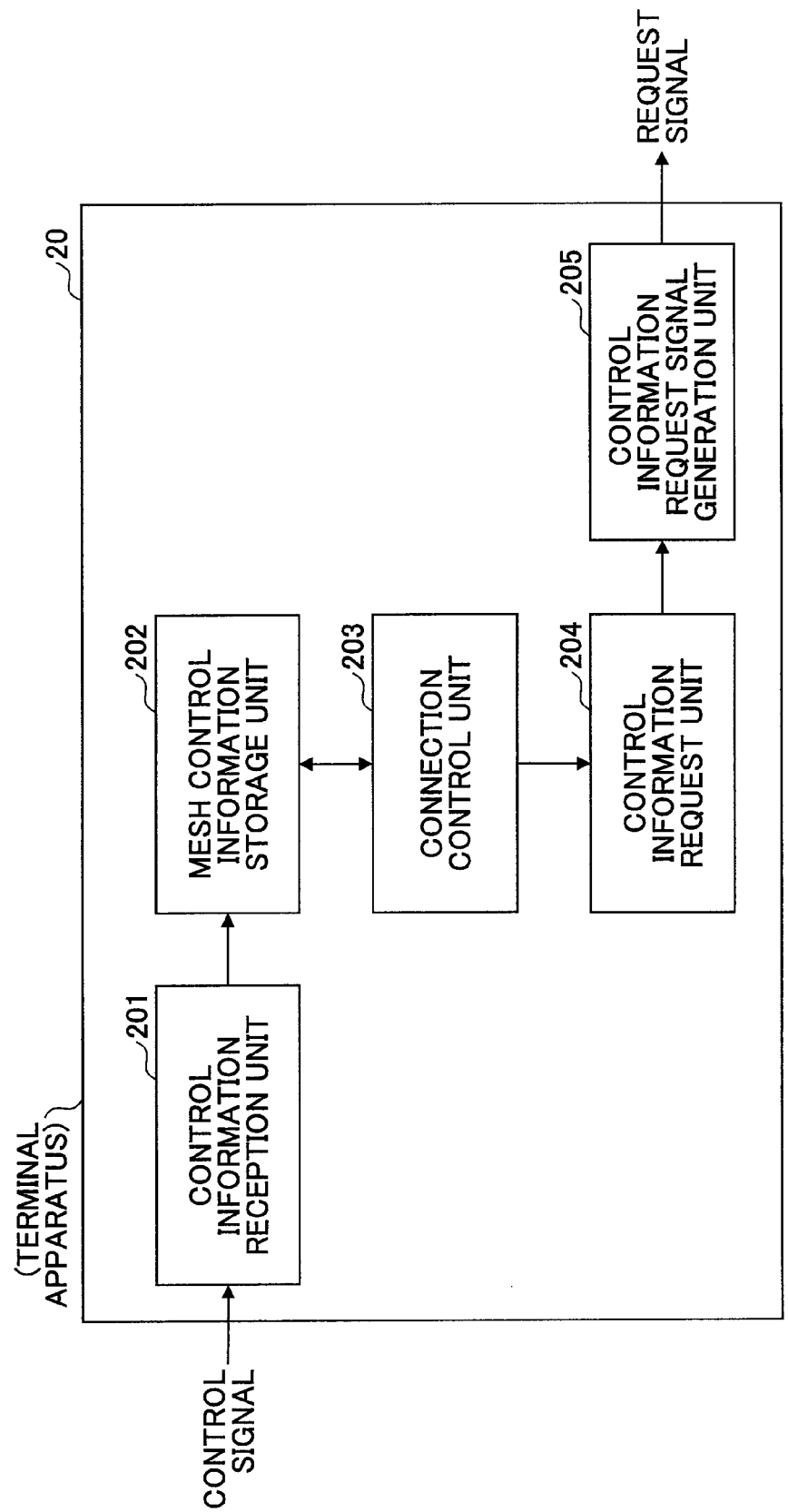
FIG. 2 is a block diagram illustrating a terminal apparatus according to one embodiment of the present invention.

FIG. 2 illustrates a terminal apparatus according to this embodiment. In FIG. 2, a control information reception unit 201, a mesh control information storage unit 202, a connection control unit 203, a control information request unit 204 and a control information request signal generation unit 205 are illustrated. The control information reception unit 201 and the mesh control information storage unit 202 play a main part in reception operations. The control information request unit 204 and the control information request signal generation unit 205 play a main part in generation of request signals.

The control information reception unit 201 receives the first or second common control signal delivered from the delivery apparatus.

The mesh control information storage unit 202 extracts system information from the received first or second common control signal and stores the extracted system information. The first common control signal includes a system information class that the delivery apparatus transmits to all the terminal apparatuses in all areas (all meshes). The second common control signal includes a specific system information class that the terminal apparatuses individually requested for the delivery apparatus.

The connection control unit 203 controls connection with the radio system. The terminal apparatus uses the above system information to access the radio system and obtains connection control information required to establish the connection from the radio system.

The control information request unit 204 determines whether all the system information items required to access the radio system have been obtained.

If all the system items have not been obtained, the control information request unit 204 generates a request signal as stated below. The determination as to whether all the system information items have been obtained may be made by determining the flags corresponding to the received individual system information classes.

If all or a portion of the required system information items lack, the control information request signal generation unit 205 transmits the request signal.

[C. Common Control Signal and Request Signal]

Figure 3:
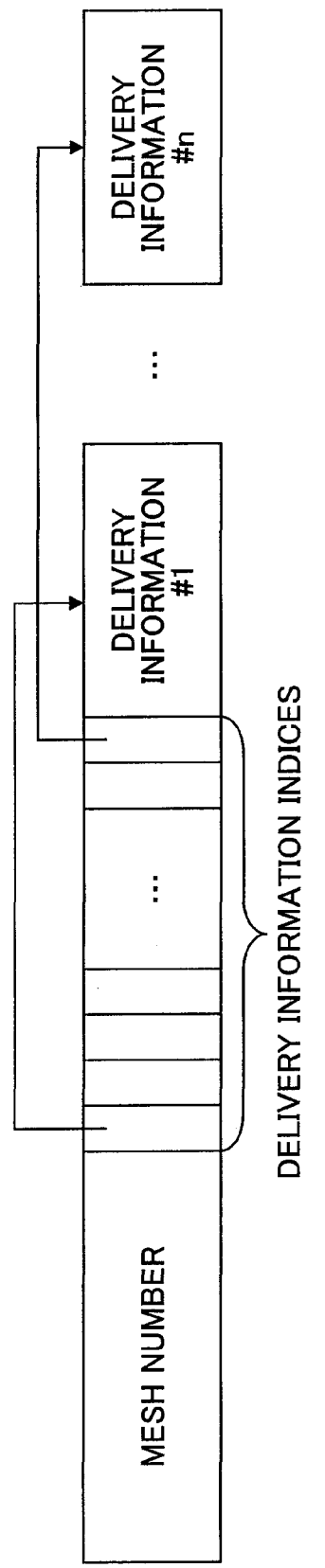
FIG. 3 is a signal structure diagram illustrating common control information according to one embodiment of the present invention.

FIG. 3 illustrates a common control signal for use in this embodiment. The first common control signal includes a system information item to be transmitted from the delivery apparatus to all the terminal apparatuses in all areas (all meshes). The second common control signal includes a specific system information item requested by the individual terminal apparatuses for the delivery apparatus. In the illustration, the system information items are indicated by delivery information indices. Although the system information items may be baseband bandwidth information, fundamental RAT information (information regarding radio access technologies), extended technology information, quality information, charge method information and so on, they are not so limited. Although the mesh information is represented by numbers in the illustration, it may be instead represented by any other appropriate identification for identifying areas. These system information items make up system information required to access radio systems operated in the individual areas. The common control signal is divided into the first common control signal and the second common control signal, and it significantly differs from conventional cognitive pilot channels (CPC) in that the division scheme is updated timely.

Figure 4:
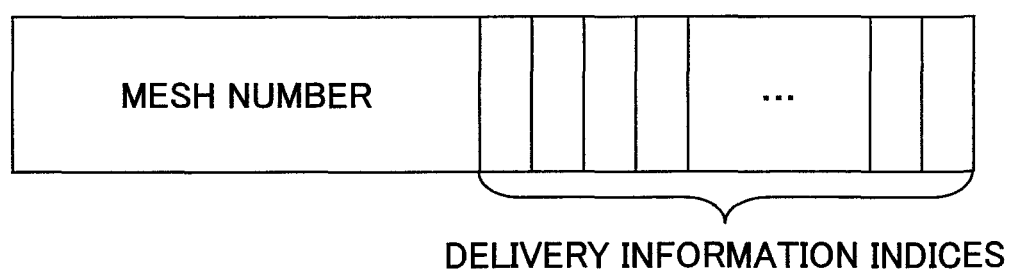
FIG. 4 is a signal structure diagram illustrating a request signal according to one embodiment of the present invention.

FIG. 4 illustrates an exemplary request signal. If the terminal apparatus receives the first common control signal but does not still obtain any necessary information item, the request signal is transmitted from the terminal apparatus to the delivery apparatus. The request signal includes mesh information for identifying a mesh or an area where the terminal apparatus resides together with identification information for identifying necessary system information items. The necessary system information item is indicated by a request information index. An information item indicated by the request signal as being the necessary system information item is subsequently provided to the terminal apparatus in the second common control signal. The mesh information is represented as numbers in the illustration but may be represented by any other appropriate identification for identifying areas.

[D. Determination of First Common Control Signal]

Figure 5:
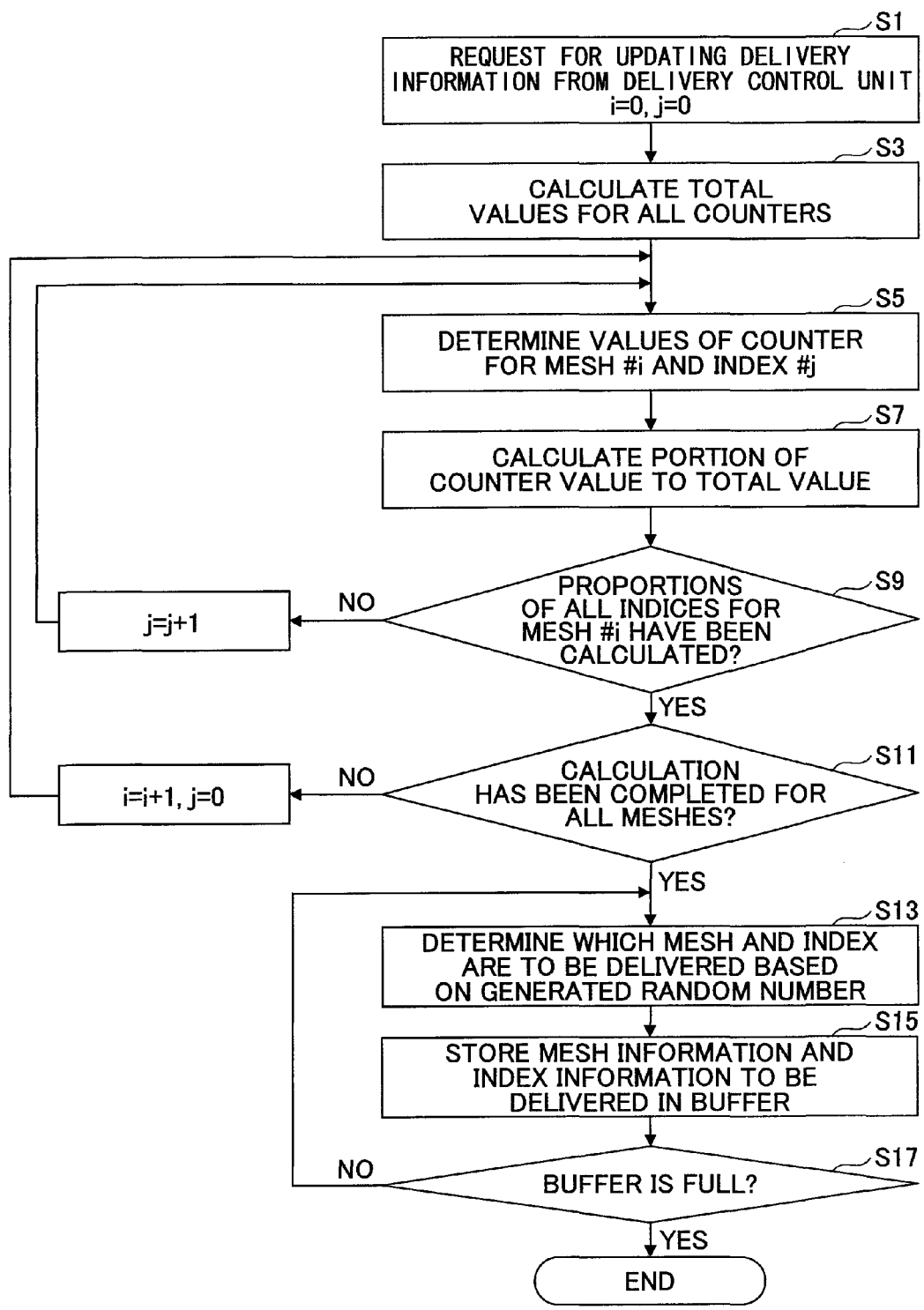
FIG. 5 is a flowchart illustrating an exemplary operation for determining a first common control signal according to one embodiment of the present invention.

FIG. 5 is a flowchart illustrating an exemplary determination method of the first common control signal. For convenience, six system information classes in system information are identified by A-F.

The flow starts with step S1 where parameter i for indicating a mesh number and parameter (index) j for indicating system information classes A-F are set to respective initial values. Criteria to determine which of the system information classes is to be included in the first common control signal is updated periodically and/or non-periodically. The update frequency may be set to any appropriate value. For example, if the delivery criteria are updated every day, the timer of the delivery apparatus detects passage of one day, and the flow starts. As stated above, the request signal classification unit 102 and the request signal counter 103 provide statistic information regarding request signals received from the previous update.

At step S3, the total amount of request signals received from all the terminal apparatuses is determined. The total amount of received request signals is not only for the individual meshes but also for all the meshes. The request signal counter 103 in FIG. 1 may count the request signals for each of the meshes, for example. At step S3 in FIG. 5, the total of such counts calculated for all the meshes is determined.

At step S5, for mesh number i, the number of requests is determined for each of system information classes A-F.

At step S7, the total amount of received request signals calculated at step S3 and the total counts calculated at step S5 are used to determine the request frequency of each of system information classes A-F for mesh number i. Typically, the request frequency is derived by dividing the total counts with the total amounts of received request signals. This request frequency may be referred to as a ratio or probability. As stated below, some sort of priority may be additionally taken into account in calculating the ratio from the total counts.

At step S9, it is determined whether the request frequency has been calculated for all system information classes A-F. If the request frequency has not been calculated, the flow returns to step S5, and otherwise, the flow proceeds to the next step.

At step S11, it is determined whether the index ratio has been calculated for all the meshes. If the ratio has been calculated, the flow returns to step S5, and otherwise, the flow proceeds to the next step.

At step S13, a certain system information class for a certain mesh is selected by using a random number. For convenience, it is assumed that there are two meshes and that the ratios of requests for system information classes A, B and C are equal to 3/6, 1/6 and 2/6, respectively, for mesh #1. Also, it is assumed that the ratios of requests for system information classes A, B, C and D are equal to 2/8, 4/8, 1/8 and 1/8, respectively, for mesh #2. In this case, the total amount of requests calculated for all the meshes at step S3 is equal to 14 (=6+8). Then, any value between 1 and 14 is assigned to the system information classes for meshes #1 and #2. For example, the individual values between 1 and 14 may be associated with the individual system information classes as follows, 1, 2, 3: A for mesh #1;
4: B for mesh #1;
5, 6: C for mesh #1;
7, 8: A for mesh #2;
9, 10, 11, 12: B for mesh #2;
13: C for mesh #2; and
14: D for mesh #2.

At step S13, any value between 1 and 14 is selected by using a random number. For example, the values maybe straightforwardly found from random numbers of less than or equal to 14. Alternatively, the values may be determined based on a remainder of division of random number R generated without the above limitation by 14 (R mod 14).

At step S15, the mesh number and the system information class selected at step S13 are included in the first common control signal. In other words, information regarding the mesh number and the system information class is stored in a transmission buffer for the first common control signals.

At step S17, it is determined whether the transmission buffer is full. If the transmission buffer is not full, the flow returns to step S13 where another random number is generated. On the other hand, if the transmission buffer is full, the flow for providing the first common control signal ends and waits for the next update timing.

In this manner, contents of the first common control signal are determined depending on the request frequency, and thus the common control signal is provided corresponding to current communication environment. Accordingly, there is a higher likelihood that the system information items required for the terminal apparatus maybe included in the first common control signal, which can reduce transmissions of the request signals and the second common control signals. In this manner, it is possible to improve delivery efficiency of the system information.

Figure 6:
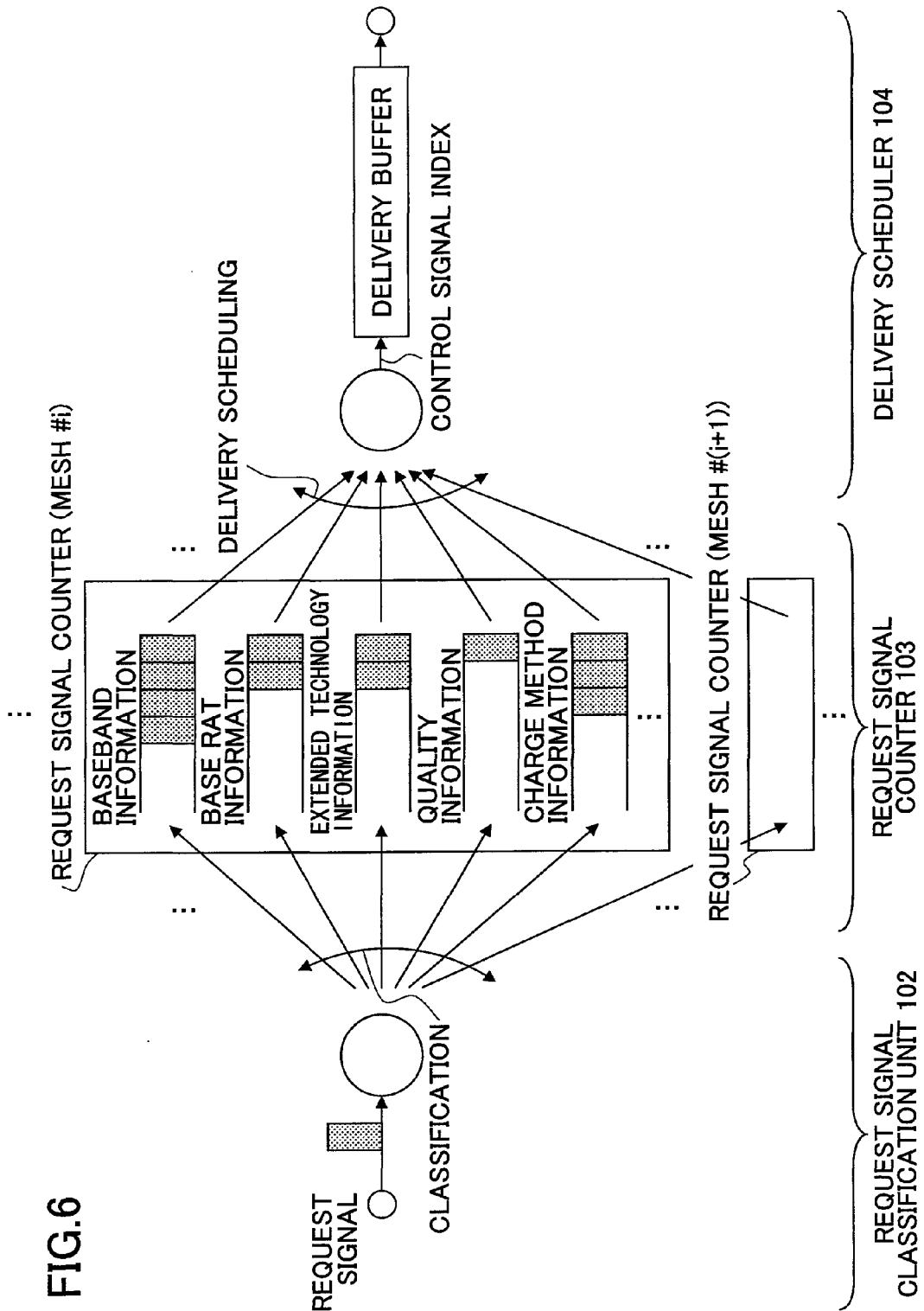
FIG. 6 schematically illustrates an exemplary operation for generating the first common control signal according to one embodiment of the present invention.
Figure 7:
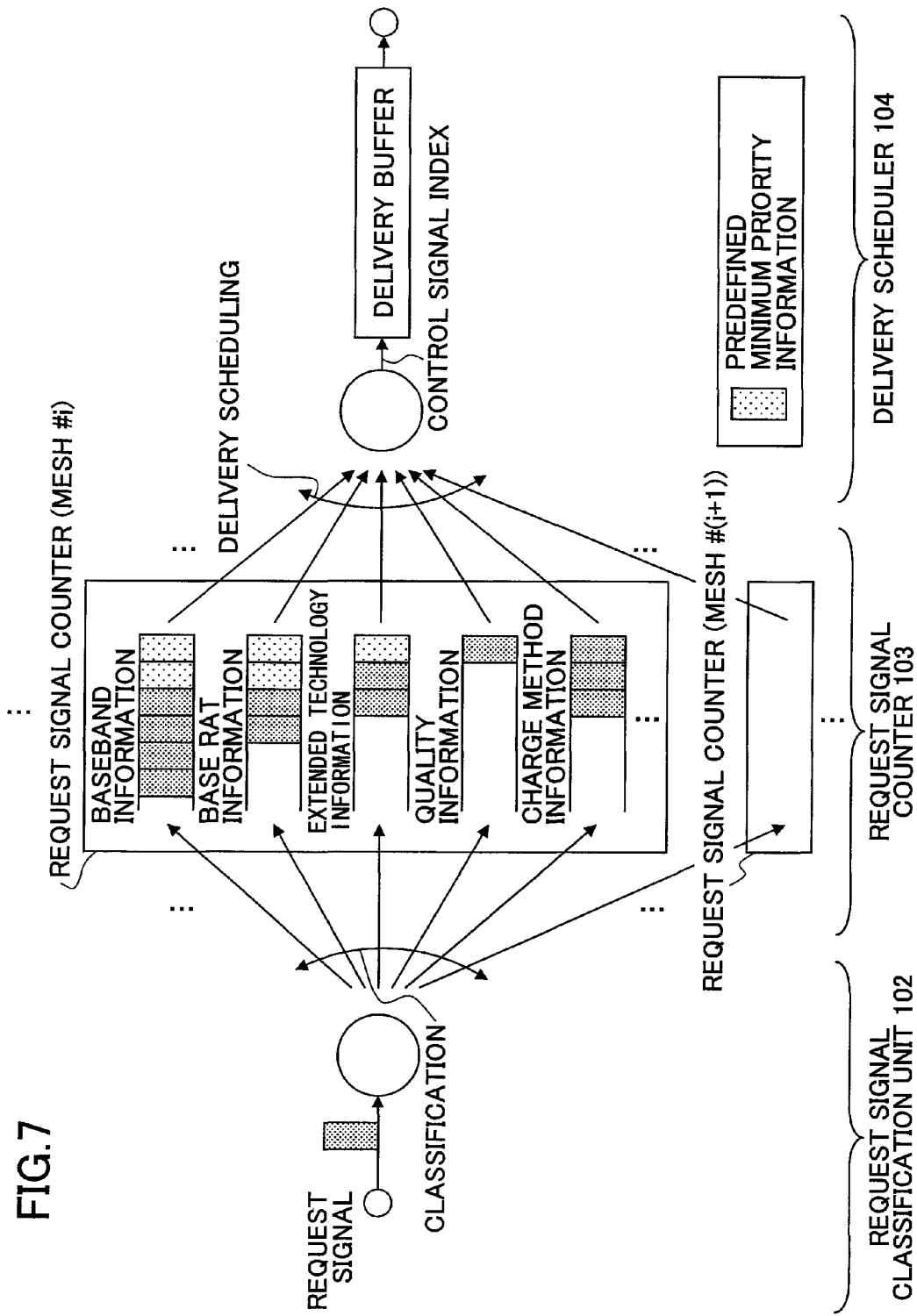
FIG. 7 schematically illustrates a generation operation of the first common control signal in consideration of priority.
Figure 8:
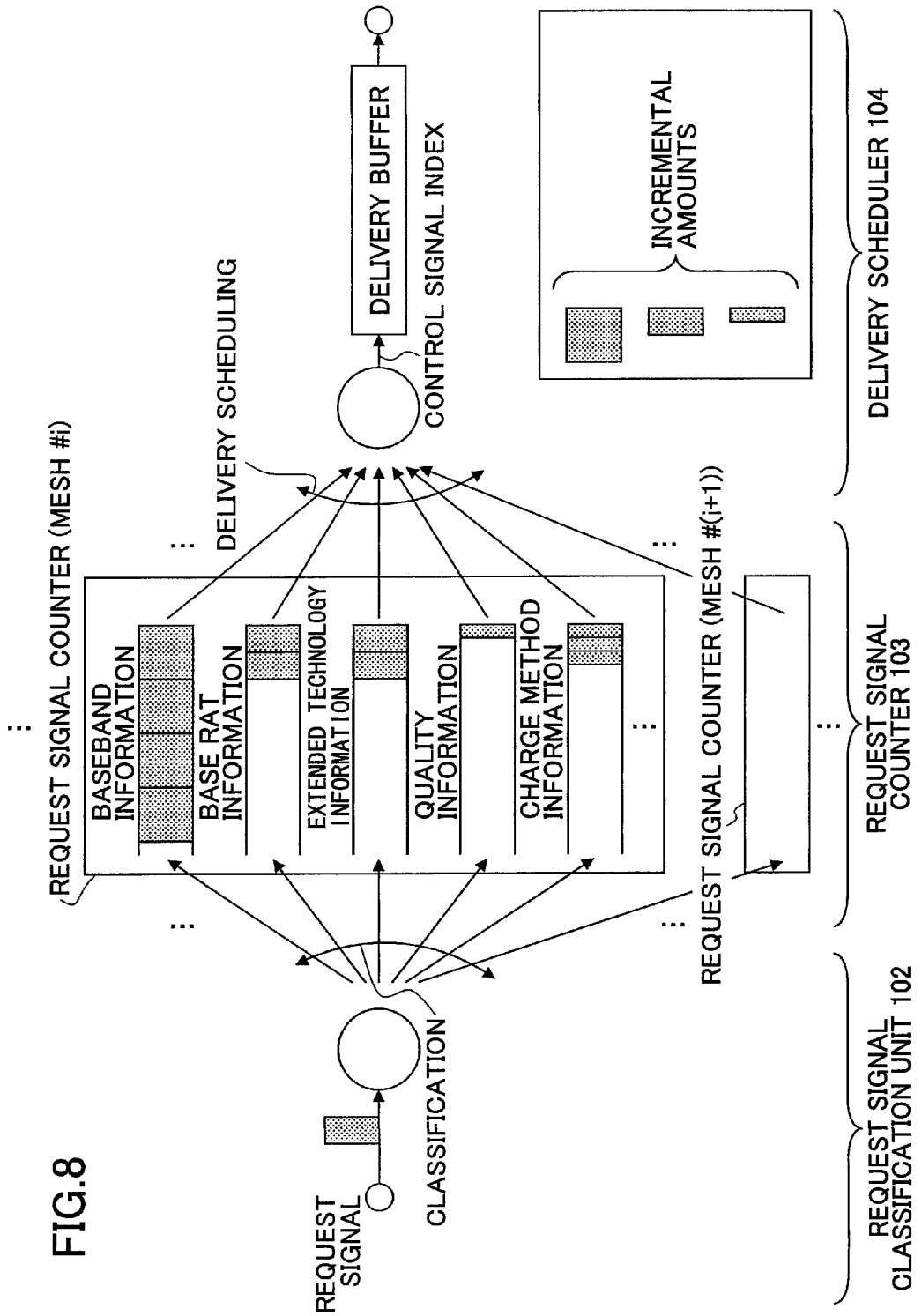
FIG. 8 schematically illustrates a generation operation of the first common control signal in consideration of priority in another manner.

Meanwhile, the same counting method is applied for system information classes A, B, . . . in the above-mentioned operation, but different counting methods may be applied. FIG. 6 illustrates an example where the same counting method is applied to different system information classes A, B, . . . for comparison. On the other hand, in the example illustrated in FIG. 7, a counting method is devised such that a counter value for a certain system information class may be highly likelihood to be greater than the other counter values. Counters for baseband information, fundamental RAT information and extended technology information are initially added by a predefined amount and may be more likely to be greater than counters for the other information items accordingly. (In the illustrated example, the counters are initially added by 2.) In other words, the counters for these system information classes are not reset to 0 even if they are updated, and they are kept to be greater than or equal to a predefined value (greater than or equal to 2). In the illustrated example, the added amount at the reset time is referred to as minimum priority information. Alternatively, as illustrated in FIG. 8, different counter added amounts (incremental amounts) maybe applied to different system information classes. In this case, the counters for the system information classes are reset to 0 upon update, but the counter for the baseband information may rapidly increase compared to the counter for the charge information. In this manner, the respective counters for the system information classes increase separately, and it is possible to derive the likelihood in consideration of the importance of the system information classes.

In the above-mentioned determination method of the first common control signal, one value between 1 and 14 is selected by using a random number, and accordingly there may be cases where the system information classes for a certain mesh are infrequently selected. This is compensation for the determination of contents of the first common control signal in accordance with a statistical tendency of the request frequency. However, it may not be preferable from the viewpoint of fairness. From this viewpoint, it is preferred that the random number is generated for each mesh and any of the system information classes for any mesh is included in the first common control signal. In the above-mentioned example, first a random number between 1 and 6 is generated, and any of system information classes A, B and C for mesh #1 is selected. In this case, random numbers 1, 2 and 3 are associated with A, random number 4 is associated with B, and random numbers 5 and 6 are associated with C. The random numbers are generated within the total amount of counter values for each mesh. Then, a random number between 1 and 8 is generated, and any of system information classes A, B, C and D for mesh #2 is selected. In this case, random numbers 1 and 2 are associated with A, random numbers 3, 4, 5 and 6 are associated with B, random number 7 is associated with C, and random number 8 is associated with D. In this manner, the fairness among the meshes can be taken into account while improving delivery efficiency of the system information.

In other embodiments, the priority may be provided to not only the system information classes but also the meshes somehow. For example, the system information classes for a mesh important to the system may be more likely to be included in the first common control signal. In this manner, apart from the statistical tendency of request signals, the priority may be additionally provided to the individual system information classes and/or the individual meshes. In the case where the priority is additionally provided to the individual system information classes, the priority maybe represented through incrementing the counter value of the request signals.

[E. Delivery of First and Second Common Control Signals]

Next, operations to deliver the first and second common control signals are described. Clock signals are periodically provided from the timer 108 in FIG. 1 to the delivery control unit 107, which detects passage of a predefined time period. The predefined time period corresponds to an update period. The delivery control unit 107 and the delivery scheduler 104 determine contents of the first common control signal in accordance with the flowchart in FIG. 5. The delivery scheduler 104 indicates (a flag indicative of) a system information class to be delivered to the information delivery unit 106 under control of the delivery control unit 107. The information delivery unit 106 extracts contents of the indicated system information class from the delivery information storage unit 105 and transmits the first common control signal including the extracted contents. As stated above, the first common control signal includes mesh information, an index of the system information class and the information contents. The first common control signal is transmitted to all the meshes.

Terminal apparatuses located within the areas receive the first common control signal and obtain one or more system information classes. The terminal apparatus determines whether all system information items required to access a desired radio communication system in the locating area have been obtained. This determination may be made by using the mesh number and the request information index (or flag) included in the request signal. If all the required system information items have been obtained, the terminal apparatus uses the system information items to access the communication system. In this case, no request signal is transmitted from the terminal apparatus, and the second common control signal is not also transmitted. On the other hand, if all the required system information items have not been obtained, the terminal apparatus identifies missing items of the system information classes and the mesh information to generate a request signal and transmits the generated request signal to the delivery apparatus. When the terminal apparatus requests the system information items, the terminal apparatus transmits the request signal by setting a flag for the request information index corresponding to the requested system information class.

Upon receiving the request signal from the terminal apparatus, the delivery apparatus forwards the request signal to the request signal classification unit, which identifies the system information class and the mesh information requested in the request signal. The identified mesh information and system information class are indicated to the delivery control unit 107 (and the request signal counter 103). The delivery control unit 107 uses the mesh information and the system information class to transmit the flag indicative of the delivered system information class to the information delivery unit 106. The information delivery unit 106 extracts the mesh information and the delivered system information class from the delivery information storage unit 105 and transmits the second common control signal including the extracted mesh information and the delivered system information class to the requesting terminal apparatus.

The present invention has been described with reference to the specific embodiments, but the embodiments are simply illustrative, and those skilled in the art will understand various variations, modifications, alterations and substitutions. Specific numerical examples have been described in order to facilitate understandings of the present invention. However, these numerical examples are simply illustrative, and any other appropriate value may be used unless specifically stated otherwise. Separation of the embodiments and sections are not essential to the present invention, and two or more of the embodiments and sections may be combined as needed. For convenience of explanation, apparatuses according to the embodiments of the present invention have been described with reference to functional block diagrams, but these apparatuses may be implemented in hardware, software or combinations thereof. The present invention is not limited to the above embodiments, and variations, modifications, alterations and substitutions fall in the present invention without deviating from the spirit of the present invention.

This international patent application is based on Japanese Priority Application No. 2008-215927 filed on Aug. 25, 2008, the entire contents of which are hereby incorporated by reference.

List Of Reference Symbols
- 10: delivery apparatus
- 101: request signal reception unit
- 102: request signal classification unit
- 103: request signal counter
- 104: delivery scheduler
- 105: delivery information storage unit
- 106: information delivery unit
- 107: delivery control unit
- 108: timer
- 20: terminal apparatus
- 201: control information reception unit
- 202: mesh control information storage unit
- 203: connection control unit
- 204: control information request unit
- 205: control information request signal generation unit

The invention claimed is:

1. A delivery apparatus for delivering a common control signal to an area having one or more available communication systems wherein the common control signal includes system information required to access the communication systems in the area, the system information including multiple control information items, the delivery apparatus comprising:
   a first generation unit configured to generate a first common control signal commonly used in one or more areas;
   a reception unit configured to receive a delivery request signal from a terminal apparatus requesting to deliver a certain control information item; and
   a second generation unit configured to generate a second common control signal including the certain control information item,
   wherein criteria to determine which of the control information items the first generation unit includes in the first common control signal are updated in accordance with a statistical tendency of the delivery request signals from the terminal apparatuses.

2. The delivery apparatus as claimed in claim 1, wherein the statistical tendency represents request frequency of each of the multiple control information items.

3. The delivery apparatus as claimed in claim 2, wherein the respective control information items for each area are associated with one or more values within a numerical range, and the control information item corresponding to a random number generated within the numerical range is included in the first common control signal.

4. The delivery apparatus as claimed in claim 1, wherein the criteria to determine which of the control information items the first generation unit includes in the first common control signal are updated in accordance with the statistical tendency of delivery request signals from the terminal apparatuses and priority of the control information items.

5. A terminal apparatus for receiving a common control signal in an area having one or more available communication systems wherein the common control signal includes system information required to access the communication systems, the system information including multiple control information items, the terminal apparatus comprising:
   a reception unit configured to receive a first common control signal or a second common control signal transmitted from a delivery apparatus;
   an acquisition unit configured to acquire one or more of the control information items from the first common control signal or the second common control signal;
   a generation unit configured to generate a delivery request signal for requesting to deliver a certain control information item; and
   a transmission unit configured to transmit the delivery request signal to the delivery apparatus,
   wherein
   the first common control signal is received, and after the delivery request signal is transmitted, the second common control signal including the certain control information item is received, and
   criteria to determine which of the control information items is to be included in the first common control signal are updated in accordance with a statistical tendency of delivery request signals received at the delivery apparatus.

6. The terminal apparatus as claimed in claim 5, wherein if it is determined that required control information items have not been obtained, the delivery request signal is generated.

7. A delivery system including a delivery apparatus for delivering a common control signal to an area having one or more available communication systems and a terminal apparatus for receiving the common control signal transmitted from the delivery apparatus wherein the common control signal includes system information required to access the communication systems in the area, the system information including multiple control information items, the delivery apparatus comprising:
- a first generation unit configured to generate a first common control signal commonly used in one or more areas;
- a reception unit configured to receive a delivery request signal from the terminal apparatus requesting to deliver a certain control information item; and
- a second generation unit configured to generate a second common control signal including the certain control information item, the terminal apparatus comprising:
- a reception unit configured to receive the first common control signal or the second common control signal transmitted from the delivery apparatus;
- an acquisition unit configured to acquire one or more of the control information items from the first common control signal or the second common control signal;
- a generation unit configured to generate a delivery request signal for requesting to deliver a certain control information item; and
- a transmission unit configured to transmit the delivery request signal to the delivery apparatus, wherein
the first common control signal is delivered to one or more areas, and in response to the deliver request signal from the terminal apparatus, the second common control signal including a certain control information item is delivered to the terminal apparatus, and criteria to determine which of the control information items the first generation unit includes in the first common control signal are updated in accordance with a statistical tendency of the delivery request signals from the terminal apparatuses.

8. A method for use in a delivery system including a delivery apparatus for delivering a common control signal to an area having one or more available communication systems and a terminal apparatus for receiving the common control signal transmitted from the delivery apparatus wherein the common control signal includes system information required to access the communication systems in the area, the system information including multiple control information items, the method comprising:
- generating a first common control signal commonly used in one or more areas at the delivery apparatus;
- receiving a delivery request signal from the terminal apparatus requesting to deliver a certain control information item at the delivery apparatus; and
- generating a second common control signal including the certain control information item at the delivery apparatus and transmitting the second common control signal to the terminal apparatus,
- wherein criteria to determine which of the control information items is included in the first common control signal in generating the first common control signal are updated in accordance with a statistical tendency of the delivery request signals from the terminal apparatuses.

\* \* \* \* \*